United States Patent [19]
Anderson

[11] Patent Number: 5,619,381
[45] Date of Patent: Apr. 8, 1997

[54] OFFSET ZOOM LENS FOR REFLECTIVE LIGHT MODULATORS

[75] Inventor: Doug Anderson, Richardson, Tex.

[73] Assignee: Texas Instruments Incorporated, Dallas, Tex.

[21] Appl. No.: 460,572

[22] Filed: Jun. 2, 1995

[51] Int. Cl.$^6$ .......................... G02B 15/15; G02B 15/14; G02B 3/02
[52] U.S. Cl. ........................ 359/677; 359/691; 359/717
[58] Field of Search ...................... 359/677, 680, 359/685, 691, 717, 692

[56] References Cited

U.S. PATENT DOCUMENTS 4,159,865  7/1979  Kawamura et al. .............. 359/680
5,268,790  12/1993  Chen .............................. 359/677

FOREIGN PATENT DOCUMENTS 404046309  2/1992  Japan ............................. 359/677

Primary Examiner—Georgia Y. Epps
Assistant Examiner—Ricky Mack
Attorney, Agent, or Firm—Julie L. Reed; James C. Kesterson; Richard L. Donaldson

[57] ABSTRACT

A projection optical system. The system (10) contains two movable lens groups, a zoom lens group (20) and a compensator group (18). The compensator group (18) includes a movable aperture stop (21), thereby eliminating the need for a variable aperture stop. Both groups contain at least one aspheric lens element (22, 32) for elimination of aberrations. The compensator group has a positive power, with the zoom group having a negative power, resulting in a reverse telephoto configuration.

7 Claims, 2 Drawing Sheets

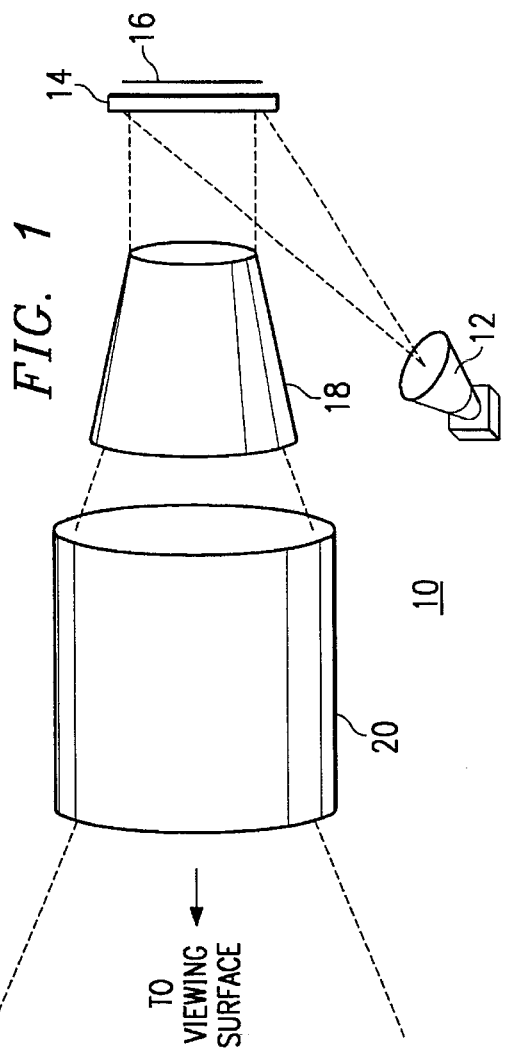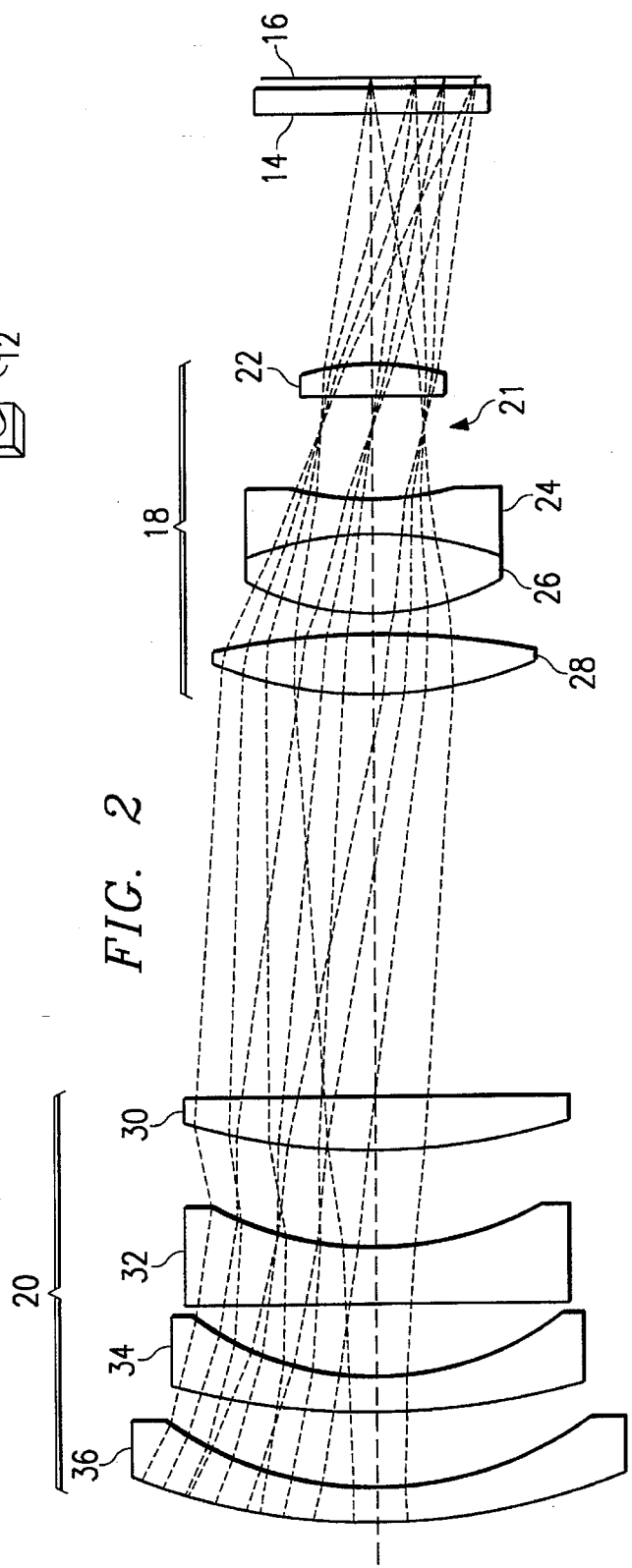

OFFSET ZOOM LENS FOR REFLECTIVE LIGHT MODULATORS

BACKGROUND OF THE INVENTION

1. Field of the Invention

This invention relates to projection optical systems, more particularly to projection optical systems with variable magnification.

2. Background of the Invention

Projection displays have several constraints that present obstacles to designing their optical system. These typically require low distortion for clearer viewing, wide field angles to present a clear picture to a large number of viewers in a given area, high resolution for picture quality, high light throughput for brightness and uniform screen illumination. The use of reflective spatial light modulators add further constraints to the design.

Spatial light modulators, in this context, are arrays of individually addressable elements, where each element typically represents one picture element, or pixel, in the viewed image. Reflective spatial light modulators will often comprise arrays of these elements, each of which is capable of reflecting light to the display surface or away from the display surface. Transmissive modulators, in contrast, typically lie directly in the light path, either transmitting or blocking the light as addressed.

Some problems with illumination efficiency and artifacts can be eliminated with reflective modulators by using offset projection. Typically, the modulators will be lined up to be on the axis of the center of the projection lens. However, this can lead to a distortion referred to as keystoning. Keystoning arises when the projection axis is not perpendicular to the screen. For example, a projector sitting on a table is tilted upward to project an image which is entirely above the table level. Because the top of the image is farther from the projector than the bottom of the image, the upper corners of the image are farther apart than the lower corners. By moving the modulator off of the axis of the projection lens, this result can be avoided.

In addition to all of these requirements, reflective modulators require long back focal lengths. Light impinges the modulator and is formed into an image as the modulator reflects the light off of the modulator array. The incoming light path and the reflected light path must stay separate from each other, or the image will be affected. This separation can be accomplished by increasing the amount of space between the incoming light path and the outgoing light path, which results in a long back focal length.

Finally, it is often desirable to have variable magnification, as in a zoom lens, in a projector that can meet all of the above requirements. Therefore, some optical system is needed that meets the requirements of low distortion; wide field capability; uniform screen illumination; zoom capability and offset projection.

SUMMARY OF THE INVENTION

A projection optical system is disclosed herein. It includes two movable lens groups, a zoom lens group and a compensator group. The zoom lens group has negative power. The compensator group has positive power, contains at least one aspheric lens and has an aperture stop that moves with the compensator group. The compensator group also includes at least two other lens elements that are fixed together.

It is an advantage of the invention that it allows for low distortion and high resolution in projected images.

It is a further advantage of the invention in that it eliminates the need for a variable aperture stop.

It is a further advantage of the invention that it uses a limited number of lens elements.

It is a further advantage of the invention that it couples the projection system efficiently with reflective spatial light modulators and their illumination systems.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows an embodiment of an offset projection system for reflective spatial light modulators.

FIG. 2 shows one embodiment of a projection optical system at its minimum focal length configuration.

DETAILED DESCRIPTION OF THE PREFERRED EMBODIMENTS

Figure 3:
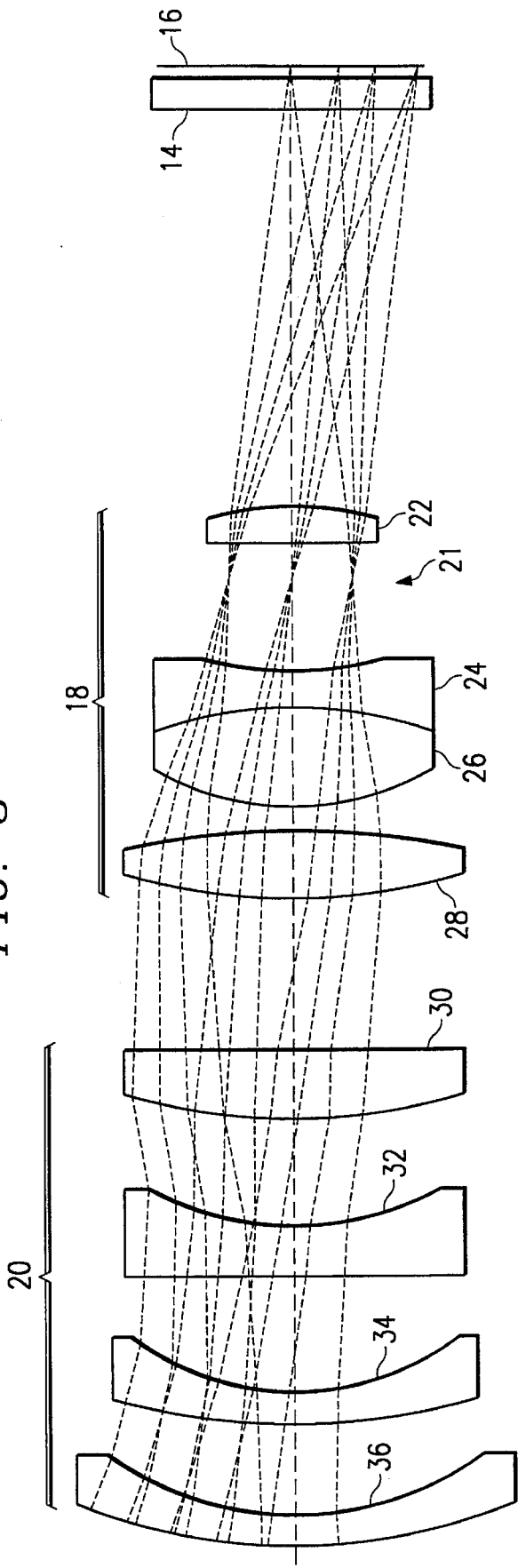
FIG. 3 shows one embodiment of a projection optical system at its maximum focal length.

FIG. 1 shows a minimal projection system 10 which uses a reflective spatial light modulator 16 and allows for variable magnification. The light source 12 illuminates the modulator 16 through the window 14. Typically, spatial light modulators consist of addressing circuitry which activates the individual elements of an array on the modulator. For ruggedness and transportability, the modulators are normally packaged in a sealed environment with a window on the top to allow the modulators to receive and reflect light.

The incoming light is formed into an image by the selection of certain ones of the individual elements. The selected elements reflect the light that impinges those elements to a first lens group 18, shown here in a barrel package, which hereinafter will be referred to as the compensator group. The compensator group then passes the light to a second lens group 20, hereinafter referred to as the zoom lens group. The magnified image is then sent to the viewing surface. The size of the image projected upon the viewing surface depends upon the locations of the compensator group and the zoom lens group, both of which move.

Side views of the light path from the spatial light modulator 16 to the viewing surface, the projection light path, are shown in FIGS. 2 and 3. In these figures, the lenses within each group are shown without their package. FIG. 2 shows the overall zoom lens at its minimum focal length configuration. Lens group 18, the compensator group includes the aperture stop 21. The aperture stop 21 moves with the compensator group 18. This enables the f-number of the system to change with display magnification, maintaining a constant display luminance, and eliminates the need for a variable aperture stop.

The variable aperture stop refers to the ability to change the opening of the stop as in the f-stop of a 35 mm camera lens, for instance. These are often motorized and add considerable complexity to the mechanical system. Because the aperture in this system moves with the compensator group, the f-number of the system naturally changes in a way that tends to keep the screen luminance (brightness) constant.

This embodiment uses reverse telephoto configuration, with the compensator group being of positive optical power and the zoom group being of negative power. The compensator group as shown here is in a "+ + − +" configuration. Lens elements 28, 26 and 22 are all of positive power, and lens element 24 is of negative power. Lens element 22 is aspheric, which allows control of optical aberrations. Aberrations describe the departure from perfection of the image formed by a lens system. They result from the fact that spherical surfaces, which are easy to make, do not form perfect images. These are called monochromatic aberrations to distinguish them from the chromatic aberrations. Chromatic aberrations arise from the variation of the index of refraction of glass with wavelength, or color.

Monochromatic aberrations are typically reduced by increasing the number of lenses in a design. Aspheric surfaces can be used to achieve similar performance with fewer lens elements. However, aspheres are difficult to make and especially to measure that the correct shape has been made. In addition, the materials and processes which can be used to make aspheres are limited.

In one embodiment of the invention, these lenses are made with acrylic plastic which may be diamond point machined or injection molded to create the aspheric surface. Chromatic aberrations are typically reduced by using positively and negatively powered lens elements from different glasses. These elements are then cemented together to eliminate mechanical misalignment between them since monochromatic aberrations are frequently sensitive to such misalignment.

A relatively new technique which can also reduce aberrations is using a diffractive optical element. In principal, the diffractive component can be included in the asphere manufacturing process, so no additional elements or components are necessary.

Lens group 20, the zoom lens group, has an overall configuration of "− − − +" and negative power. Lens elements 32, 34 and 36 are all of negative power, and lens element 30 is of positive power. Lens element 32 is also aspheric, much as lens element 22 is aspheric in the compensator group. Lens element 32 may include a diffractive element to aid in aberration correction.

Lens group 18 shown here has four elements in addition to the aperture stop 21, and lens group 20 also has four elements. In no way is the example shown here intended to limit the number of elements each group may have. For aberration correction, it is probably desirable to have an aspheric lens in each group.

Similarly, aperture stop 21 is shown to be between elements 24 and 22 in the compensator group, but is in no way intended to limit the placement of the aperture stop. It may be desirable to locate the aperture stop elsewhere. It will probably also be desirable to allow the aperture stop to move with the compensator group for the reasons as discussed above.

The movement of each group relative to each other determines the zoom ratio, the maximum display size to the minimum display size at a fixed distance. The position of the lens groups and the distance they move depends upon the desired zoom ratio and maintaining focus at the display. FIG. 3 shows the system at its maximum focal length configuration.

This projection optical system of movable lens groups where each group contains at least one aspheric lens, and the groups are in reverse telephoto configuration, has several advantages. Compared to present embodiments of projection systems with variable magnification, this system has low distortion and high resolution with fewer lens elements. Additionally, it does not require a variable aperture stop and allows for efficient coupling of a reflective light modulator and its illumination system to the projection system.

Thus, although there has been described to this point particular embodiments of an offset projection optical system with variable magnification, it is not intended that such specific references be considered as limitations upon the scope of this invention except in-so-far as set forth in the following claims.

What is claimed is:

1. An optical system with variable magnification, comprising:
   a zoom lens group including at least one aspheric lens, said zoom lens group having negative optical power and being movable;
   a compensator lens group having positive optical power and being movable, said compensator group including:
      at least one aspheric lens element; and
      at least two other lens elements, wherein said at least two other lens elements are fixed together to minimize chromatic aberrations in said system; and
   a aperture stop located with said compensator group and which moves with said compensator group thereby allowing constant brightness.

2. The optical system of claim 1, wherein said zoom lens group comprises four lenses.

3. The optical system of claim 1, wherein said compensator group comprises four lenses.

4. The optical system of claim 3 wherein said aperture stop is located between the third and fourth element of said compensator group.

5. The optical system of claim 1, wherein said aspheric lens included in said zoom group includes a diffractive component.

6. The optical system of claim 1 wherein said aspheric lens included in said compensator group includes a diffractive component.

7. An optical system with variable magnification comprising:
   a zoom lens group which has negative power and is movable, including:
      first and second lens elements of negative power;
      a third lens element wherein said third lens element is aspheric and has negative power; and
      a fourth lens element having a positive power;
   a compensator lens group which has positive power and is movable, including:
      first and second lens elements of positive power;
      a third lens element of negative power which is fixed to said second lens element; and
      a fourth lens element which has positive power; and
   an aperture stop located between said third lens element and said fourth lens element of said compensator group, said aperture stop being movable with said compensator group.

* * * * *